Dec. 25, 1956 H. D. KESLING 2,775,036
APPARATUS FOR AND METHOD OF FORMING
TOOTH POSITIONING APPLIANCES
Original Filed Nov. 25, 1946 3 Sheets-Sheet 1
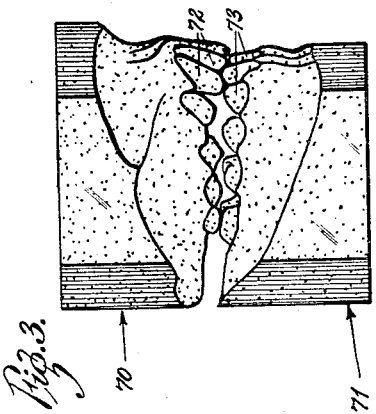
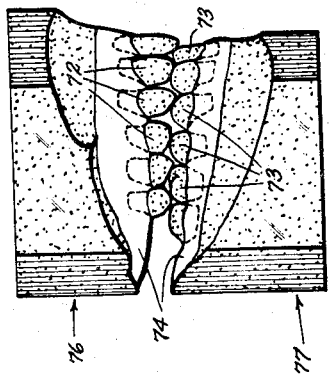
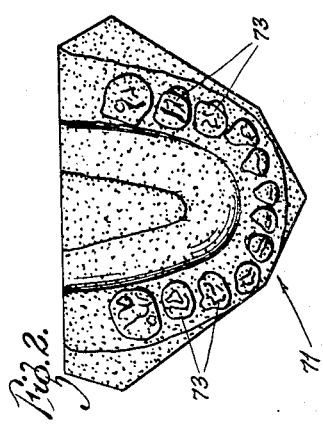
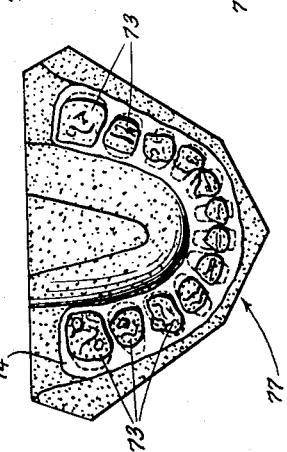
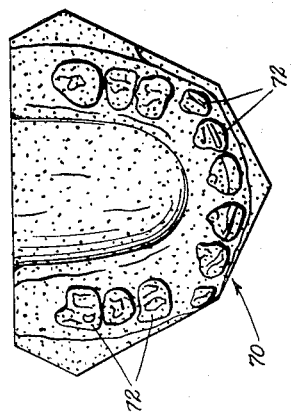
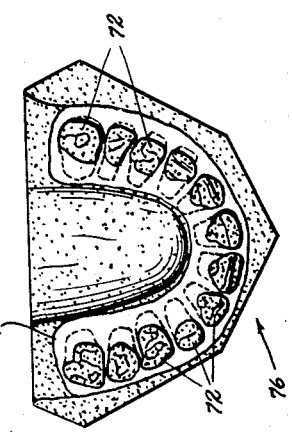
INVENTOR:
HAROLD D. KESLING,
BY Kingsland, Rogers & Ezell
ATTORNEYS.

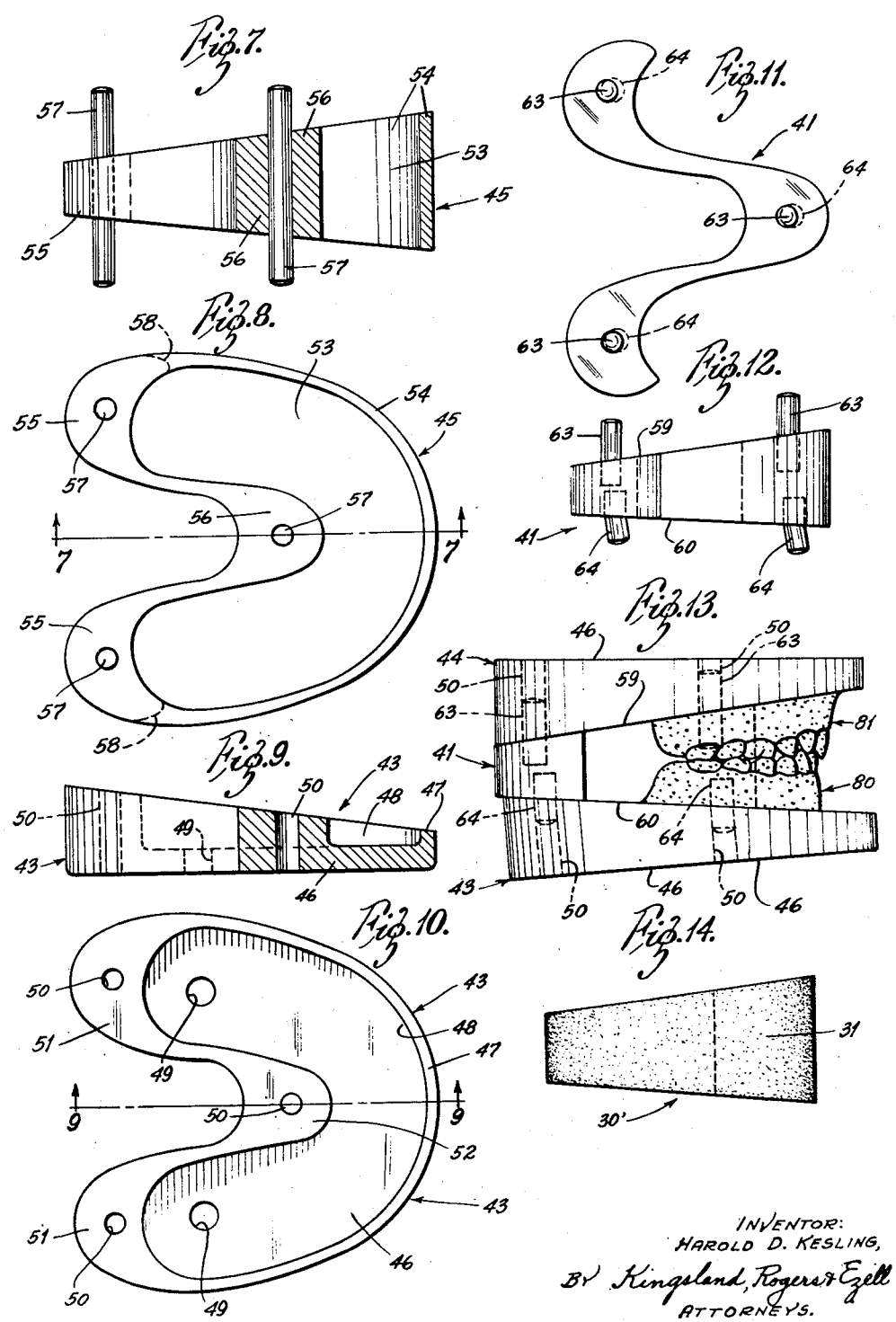

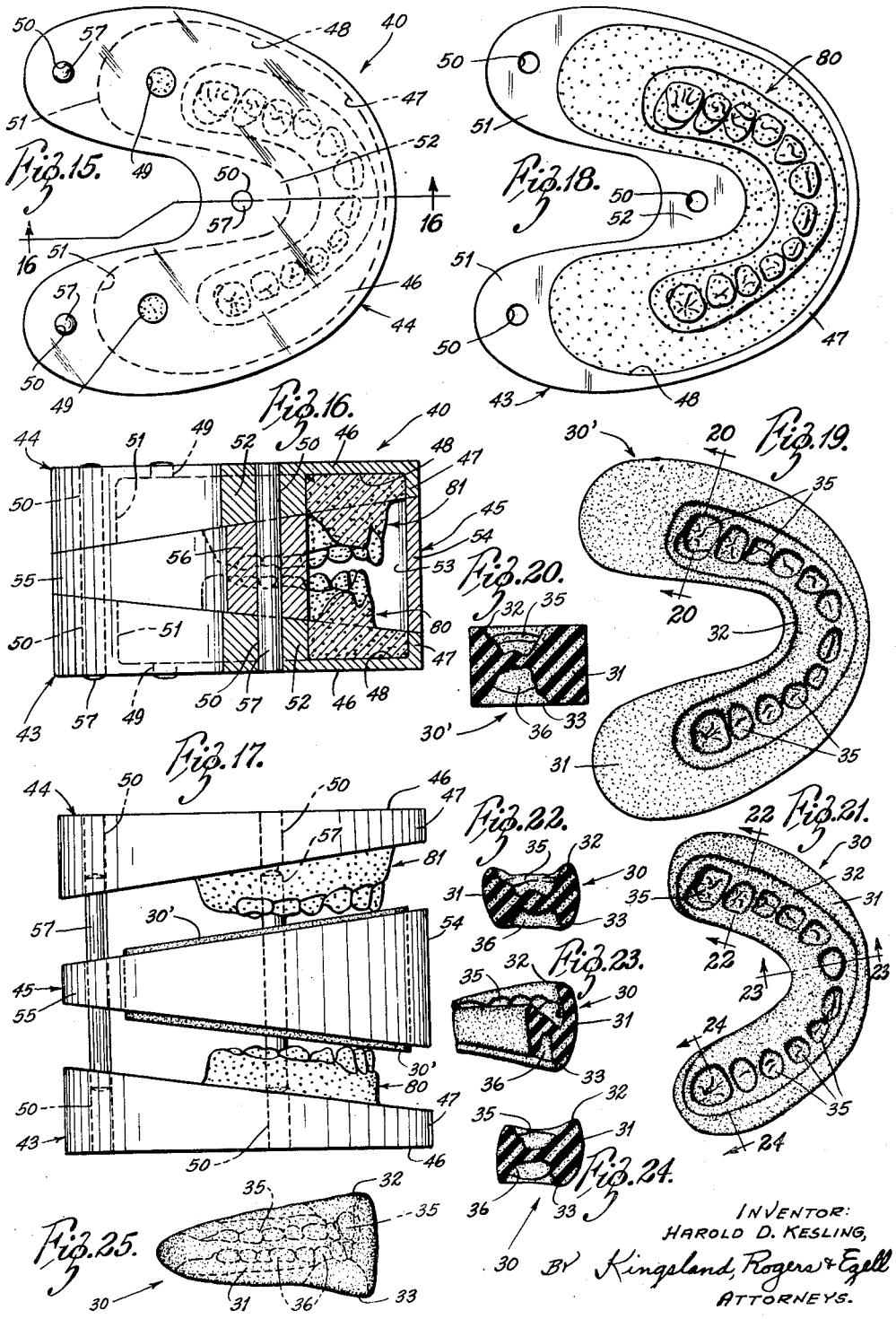

United States Patent Office 2,775,036
Patented Dec. 25, 1956

2,775,036

APPARATUS FOR AND METHOD OF FORMING TOOTH POSITIONING APPLIANCES

Harold D. Kesling, La Porte, Ind.

Original application November 25, 1946, Serial No. 712,212. Divided and this application November 15, 1950, Serial No. 195,842

9 Claims. (Cl. 32—14)

The present invention relates generally to means for and methods of forming dental devices, and more particularly to a flask device in which a tooth positioning appliance is formed and to the method of forming the tooth positioning appliance by employment of the flask device.

The present application is a division of my copending application Serial No. 712, 212, filed November 25, 1946, for Tooth Positioning Appliances (Patent No. 2,531,- 222) in which is incorporated the need, the background and use of the appliance made by the present apparatus and method.

The present novel flask device and the method of employing it to make tooth positioning appliances affords an efficient and accurate apparatus for and method of forming tooth positioning appliances which is radically different from anything heretofore found in the dental art.

In brief, the flask device includes a flask comprising an upper base, a lower base, and a center element which are pin aligned, and a spacer employed with the flask in carrying out the present novel method of forming a tooth positioning appliance.

Therefore, an object of the present invention is to provide a novel device for forming a tooth positioning appliance which is efficient in operation and which provides a tooth positioning appliance of proper configuration and relationship of teeth receiving cavities.

Another object is to provide a novel flask and associated spacer element in which the present novel tooth positioning appliance is readily, accurately, and efficiently formed.

Another object is to provide a novel method of forming the present novel tooth positioning appliance which is efficient and which achieves accurate results.

Other objects are to provide a novel flask for forming a tooth positioning appliance, which is sturdy in construction, which may be readily employed by technicians or other instructed personnel, which is inexpensive, which is readily fabricated, and which incorporates numerous other advantages.

Still other advantages are to provide a novel method of forming a tooth positioning appliance which may be readily followed by laboratory technicians or other instructed personnel, which is productive of a maximum number of appliances with a minimum number of rejects, and which incorporates other advantages.

Other objects and advantages, in addition to the foregoing, are apparent from the following description taken with the accompanying drawings, in which:

Fig. 1 is a plan view of a plaster model of the upper teeth of an individual prior to application of the present tooth positioning appliance;

Fig. 2 is a plan view of a plaster model of the lower teeth of an individual prior to application of the present tooth positioning appliance;

Fig. 3 is a side elevational view of the plaster models shown in Figs. 1 and 2 showing the upper and lower teeth in closed or occluded relation;

Fig. 4 is a plan view of a plaster model involving the same teeth shown in Fig. 1, but showing these teeth disposed in the desired straightened relationship after dissection from an original plaster model and resetting by wax or other suitable material;

Fig. 5 is a plan view of a plaster model involving the same teeth shown in Fig. 2, but showing these teeth disposed in the desired straightened relationship after dissection from an original plaster model and resetting by wax or other suitable material;

Fig. 6 is a side elevational view showing the plaster models of Figs. 4 and 5 with the teeth in closed or occluded position;

Fig. 7 is a central vertical cross-sectional view through the center element of the present novel flask taken on the line 7—7 of Fig. 8;

Fig. 8 is a plan view of the center element of the present novel flask;

Fig. 9 is a central vertical cross-sectional view through the lower base of the present novel flask taken on the line 9—9 of Fig. 10;

Fig. 10 is a plan view of the lower base of the present novel flask;

Fig. 11 is a plan view of a spacer element employed in the instant novel method of forming the tooth positioning appliance;

Fig. 12 is a side elevational view of the spacer element shown in Fig. 11;

Fig. 13 is a side elevational view of the upper and lower bases of the flask separated by the spacer element, the upper and lower bases having formed therein plaster models of reset upper and lower teeth from which a tooth positioning appliance is to be formed;

Fig. 14 is a side elevational view of a preshaped piece of resilient deformable material from which a tooth positioning appliance is to be formed;

Fig. 15 is a plan view of the upper and lower bases of the flask as shown in Fig. 13, but with the spacer replaced by the center element;

Fig. 16 is a central vertical cross-sectional view on the line 16—16 of Fig. 15;

Fig. 17 is a side elevational view of the flask with plaster models of reset teeth in the upper and lower bases, as shown in Figs. 15 and 16, but separated from the central element by the presence in the central element of an elastic moldable piece of material such as is shown in Fig. 14;

Fig. 18 is a plan view of the upper base of the flask with a plaster model of reset teeth formed therein;

Fig. 19 is a plan view of a tooth positioning appliance formed in the present flask showing the configuration thereof before trimming to mouth size;

Fig. 20 is a vertical cross-sectional view on line 20—20 of Fig. 19;

Fig. 21 is a plan view of a finished tooth positioning appliance;

Fig. 22 is a vertical cross-sectional view on the line 22—22 of Fig. 21;

Fig. 23 is a vertical cross-sectional view on the line 23—23 of Fig. 21;

Fig. 24 is a vertical cross-sectional view on the line 24—24 of Fig. 21; and

Fig. 25 is a side elevational view of the finished tooth positioning appliance.

Referring to the drawings more particularly by reference numerals, a tooth positioning appliance 30 embodying the teachings of the invention as disclosed and claimed in my above-mentioned application is shown in Figs. 21 through 25, and comprises a body 31 of resilient deformable material, such as soft vulcanizable rubber of suitable formula, either pure or synthetic. The body 31 is of integral construction and includes an upper portion 32 of U cross section and a lower portion 33 of inverted U cross section, the bights of the U-shaped upper and lower portions 32 and 33 being in abutting merging relation, as is clear from Figs. 22 through 24. The legs of each of the U-shaped portions 32 and 33 merge with each other, as is clear from Figs. 21, 22 and 24, so that, in effect, there exist an upper trough and a lower trough. The inside of the inner surfaces of the legs and the bight of the upper portion 32 are formed with teeth impressions 35, which correspond to the teeth of the intended wearer disposed in predetermined ultimate positions of movement. Similarly, the inner surfaces of the legs and bight of the lower portion 33 are formed with teeth impressions 36 of the lower teeth of an intended wearer disposed in predetermined ultimate positions of movement. It is clear from Figs. 21 through 25 that the depths of the upper portion 32 and the lower portion 33 are greater than the depths of the upper and lower teeth of the intended user so that portions are provided fitting over the gums of the wearer. The outer walls of the legs of the upper and lower portions 32 and 33 are formed for comfortable fit in the mouth of the intended wearer, which is obvious from the drawings.

Preferred embodiments of the present novel flask and the spacer used therewith are illustrated in Figs. 7–13 and 15–18, and are indicated broadly by the reference numerals 40 (Figs. 15 and 16) and 41 (Figs. 11 and 12).

The flask 40 includes a lower base 43, an upper base 44, and a center element 45. A preferred form of the lower base 43 is clearly shown in Figs. 9 and 10. The lower base 43 is substantially U-shaped in plan and includes a bottom 46. Extending upwardly from the bottom 46 is a continuous wall 47 having a vertical inner face defining the sides of a trough 48 which is of U-shape in plan. The wall 47 increases in height from the bight to the ends of the legs thereof, as is clear from the drawings. Hence, the upper face of the lower base 43 is an inclined plane from bight to leg ends, preferably at an angle of between seven (7°) and eight (8°) degrees to horizontal, as is shown in Fig. 9. Vertical openings 49 are provided in the trough 48 through the bottom 46, and vertical openings 50 are provided in solid enlarged portions 51 and 52 of the wall 47 for purposes described below. Aluminum, aluminum alloys, and many other metals have been found suitable materials from which to cast or otherwise form the lower base 43, both from manufacturing and cost points of view.

The upper base 44 is identical with the lower base 43 in respect to form and material, and, therefore, detailed description is unnecessary. In the drawings, the same reference numerals employed in respect to the lower base 43 are applied to the upper base 44.

The center element 45 is shown in Figs. 7 and 8. In plan, the center element 45 has the same outline as the lower base 43 and the upper base 44; in elevation, it presents upper and lower faces in converging planes from bight to leg ends of selected degrees to dispose the bottoms 46 of the upper and lower bases 43 and 44 in parallel planes when the flask 40 is assembled (Fig. 16). The center element 45 includes an opening 53 which is U-shaped in plan and which is of the same plan outline as the troughs 48 of the bases 43 and 44. The opening 53 is defined by the vertical inner face of a continuous wall 54, the outer face of which is also preferably vertical. Anchored in enlarged portions 55 and 56 of the wall 54 are guide pins 57 which are of a diameter to snugly enter the openings 51 of the bases 43 and 44. Should it be desired to provide upper bases 44 with openings 51 out of vertical alignment with openings 51 of the lower base 43, the upper portions of the pins 57 will, of course, be suitably offset in relation to the lower portions in order to enter the offset openings 51. Separate upper and lower pins may be employed in place of the continuous pins 57, if desired. The center element 45 is preferably formed of the same material as the bases 43 and 44.

It is apparent from the drawings and the description of the flask 40 that the troughs 48 of the bases 43 and 44 are intended to be of a form and size to accommodate plaster models of the lower and upper teeth of an individual. Hence, flasks 40 of several sizes may be made to accommodate the range of arc size and formation found in the human mouth.

The spacer 41 shown in Figs. 11 and 12 is employed with the flask 40 in a manner pointed out below in a description of the present novel method of making the tooth positioning appliance 30. The spacer 41 is of the configuration clearly shown in Figs. 11 and 12, and is adapted to replace the center element 45 of the flask 40 in one step of the present novel method of forming the appliance 30. In plan, the spacer 41 is substantially the same shape as the center element 45 in that portion of the latter remaining were the latter cut through on dotted lines 58 and the thin segment of the wall 54 discarded. In elevation, however, the angle between upper plane 59 and lower plane 60 of the spacer 41 is smaller by a predetermined degree than the angle defined by the planes of the center element 45. Upper and lower aligning pins 63 and 64, respectively, are provided in enlarged portions 65 and 66, the latter being offset forwardly from the former a predetermined amount for a purpose described below. The pins 63 and 64 are disposed for engagement in the openings 50 of the upper and lower bases 43 and 44. Considering Fig. 13, it is to be observed that the spacer 41 disposes the bottom 46 of the upper base 44 in converging relation with the bottom 46 of the lower base 43, from leg ends to bight, and disposes the lower base 43 forwardly of the upper base 44.

The present novel method of forming the tooth positioning appliance 30 with the flask 40 and the spacer 41 involves the initial step of forming plaster casts of the upper and lower teeth of an individual for whom an appliance is to be formed. From the plaster casts, plaster models of the upper and lower teeth designated 70 and 71, respectively (Figs. 1 and 2), are made by any of the well-known methods and from any suitable material, such as plaster of Paris. The models 70 and 71 include plaster upper and lower teeth 72 and 73, respectively, which are the same in form and location as the corresponding teeth in the mouth of the individual to be treated. Two sets of plaster models may be made, if desired, in order to keep one set as a case record and to serve as a guide in respect to the status of the teeth of the individual at the time the tooth positioning appliance 30 is formed.

The plaster teeth 72 and 73 of one set of models 70 and 71 are dissected from their base and reset by the use of suitable wax 74 in the desired ultimate positions of movement; that is, each tooth is placed in the position it is desired it to occupy in the mouth of the individual being treated after the tooth positioning appliance 30 has accomplished its work. At the time the plaster teeth 72 and 73 are reset in wax, the plaster mount is reformed by scraping or filling to bring the arches into correspondence with the teeth as reset for both upper and lower teeth 72 and 73. Plaster models 76 and 77 of the upper and lower teeth, respectively, with the teeth 72 and 73 reset and the arches modified in accordance therewith are illustrated in Figs. 4 and 5.

In Figs. 3 and 6, respectively, the occluded relation of the teeth of an individual before treatment and as is expected to exist after treatment are shown. The teeth of the individual being treated will assume the positions of Fig. 6 after treatment with the appliance 30.

Plaster casts are made from the plaster models 76 and 77. From the plaster cast formed from the plaster model 77, a plaster model 80 is formed in the lower base 43 in the relationship clearly shown in Figs. 13, and 16–18. Plaster forced into the openings 49 assists in anchoring the model 80. The plaster material surrounding the teeth island is cut down flush with the inclined plane of the lower base 43, leaving the teeth and gum portions upstanding therefrom.

From the plaster cast formed from the plaster model 76, a plaster model 81 of the reset upper teeth is formed in the upper base 44. The relationship of the teeth formed in the upper base 44 in respect to the teeth formed in the lower base 43 is the occluded relationship, and is determined by the insertion between the upper and lower bases 43 and 44 of the spacer 41, as is clearly illustrated in Fig. 13. The plaster material surrounding the teeth island in the upper base 44 is also cut down flush with the inclined plane of the upper base 44, leaving the teeth and gum portions upstanding therefrom.

After the plaster forming the model of the upper teeth formed in the upper base 44 has hardened, the spacer 41 is removed from between the lower and upper bases 43 and 44. Attention is directed to the fact that the center element 45, when placed between lower and upper bases 43 and 44, disposes the teeth of the models 80 and 81, as is shown in Fig. 16, i. e., the lower teeth are spaced from and are to the rear of the upper teeth, being in the at-rest position which the teeth of an individual normally assume when at rest. The aforementioned relationship of the pins and the angles of the planes of the spacer 41 and center element 45 effect this important disposition.

Into the center element 45 is placed a piece of vulcanizable rubber preferably of the form of the opening 53 thereof. As is shown in Fig. 17, the piece of rubber may extend a fraction of an inch above and below the diverging planes of the center element 45. The lower and upper bases 43 and 44 with the plaster models 80 and 81 therein are disposed in relation to the center element 45, as is shown in Fig. 17. Heat to a sufficient degree, as 300–400° F., is applied in any suitable manner, such as by applying electric plaques to the upper and lower bases 44 and 43 (not shown). Pressure is applied to the bottoms 46 of the lower and upper bases 43 and 44 to press the plaster teeth carried by each into the rubber piece in the center element 45, any desired suitable mechanism such as a vise or compress being employed. The pressure is applied in a gradual manner so that, over a period of substantially thirty minutes, the lower and upper bases 43 and 44 will be moved into contiguous relation with the center element 45. This relationship of the bases 43 and 44 and the center element 45 is shown in Fig. 16, the plaster teeth being disposed in the above-mentioned at-rest position which the teeth of an individual assume when relaxed. It is manifest that temperatures and pressures will vary with material employed for the positioner 30, and for other reasons, control of these factors being within the skill of any technician.

It is to be observed that the pins 57 of the center element 45 are received into the vertical openings 50 in the lower and upper bases 43 and 44 as pressure is applied to the bases 43 and 44 during the forming of the appliance 30, as just described.

After the heated vulcanizable rubber piece disposed in the center element 45 is permanently formed with the teeth and gum impressions of the models 80 and 81, the formed rubber piece is removed from the center element 45, the same being shown in Figs. 19 and 20 and indicated 30′ for purposes of reference. The thick walls of the appliance 30′ are trimmed down to a thickness and form so that the finished tooth positioning appliance 30 (Figs. 21 through 25) readily adapts itself to the mouth of the intended wearer.

It is to be noted that the tooth positioning appliance 30 is thus formed with upper and lower teeth impressions in positions of ultimate movement of the teeth of the intended wearer and that these positions are located for the relaxed rest position of the teeth. Thus, allowance is made for the fact that the teeth of a wearer of the appliance 30 should be in the rest or slightly open position when surrounded by the appliance 30. This allowance eliminates strain on the part of the wearer of the appliance 30 and permits a suitable thickness of material between the upper and lower portions 32 and 33 of the appliance 30 so that sufficient body is provided to insure its teeth straightening performance.

As is clear from the foregoing, the relationship of the teeth of plaster models 80 and 81 in the lower and upper bases 43 and 44 when separated by the spacer 41 and by the center element 45, respectively, is that of the occluded position of the teeth and of the at-rest slightly opened position of the teeth (Figs. 13 and 16).

Allowance is made in the flask 40 for the fact that the lower teeth pivot downwardly and rearwardly in the opening of the jaw about a pivot to the rear and above the line of closure of the teeth.

It is apparent that there has been provided a novel flask for forming a tooth positioning appliance, and a novel method of forming the appliance which fulfill all of the objects and advantages sought in respect to each.

It is to be understood that the foregoing description and the accompanying drawings have been given by way of illustration and example. It is also to be understood that changes in form of the elements, rearrangement of parts or steps, and substitution of equivalent elements or steps, which will be obvious to those skilled in the art, are contemplated as within the scope of the present invention which is limited only by the claims which follow.

What is claimed is:

1. A method of forming a tooth positioning appliance comprising the steps of preparing models of the upper and lower teeth of a patient with the teeth relocated to predetermined positions of movement, reproducing the said models in separable upper and lower bases of a flask with the upper end lower teeth in occluded relation, establishing a position of said upper and lower teeth simulating the relaxed slightly opened position of the teeth, disposing resilient deformable material between said upper and lower teeth spaced apart to receive it, and returning said upper and lower teeth to the established relaxed position forming permanent impressions of the upper and lower teeth in said material to provide a tooth positioning appliance.

2. A method of forming a tooth positioning appliance comprising the steps of preparing models of the upper and lower teeth of a patient with the teeth relocated to predetermined positions of movement, reproducing the said models in separable upper and lower bases of a flask with the upper and lower teeth in occluded relation through the medium of a spacer, establishing a position of said upper and lower teeth simulating the relaxed slightly opened position of the teeth by disposing a central element between said bases, disposing resilient deformable material between said upper and lower teeth spaced apart to receive it, and returning said upper and lower teeth to the established relaxed position forming permanent impressions of the upper and lower teeth in said material through the application of heat and pressure to provide a tooth positioning appliance.

3. A method of forming a tooth positioning appliance comprising the steps of preparing models of the upper and lower teeth of a patient with the teeth relocated to predetermined positions of movement, reproducing the said models in separable upper and lower bases of a flask wtih the upper and lower teeth in occluded relation, establishing a position of said upper and lower teeth simulating the relaxed slightly opened position of the teeth, disposing resilient deformable material between said upper and lower teeth spaced apart to receive it, and returning said upper and lower teeth to the established relaxed position forming permanent impressions of the upper and lower teeth in said material through the application of heat and pressure to provide a tooth positioning appliance.

4. A dental flask set for forming a tooth positioning appliance comprising an upper base including a trough to receive and retain models of upper teeth, a lower base including a trough to receive and retain models of lower teeth, a removable central spacer element of a thickness and form spacing said base apart to positions to receive upper and lower teeth models in occluded positions, and a removable central member having an opening therethrough shaped as the troughs which replaces said central spacer element and spaces said bases with retained upper and lower models of teeth in normal relaxed positions, said central member receiving therein deformable material which receives and retains under the effects of heat upper and lower impressions from teeth models retained by said bases while in normal relaxed positions.

5. A device for forming a tooth positioning appliance comprising a lower base, an upper base, and a central element, said lower base being U-shape in plane and having a flat bottom and a continuous wall forming a U-shaped trough to receive and hold a model of lower teeth, said lower base trough forming wall sloping in height from a maximum at the ends of the legs of the U-shaped trough to a minimum at the bight thereof, said upper base being U-shaped in plan and having a flat top and a continuous wall depending from said flat top forming a U-shaped trough to receive and hold a model of upper teeth, said upper base trough forming wall sloping in height from a maximum at the ends of the legs of the U-shaped trough to a minimum at the bight thereof, said troughs being of substantially the same size, said central element being U-shape in plan and having a U-shaped opening extending therethrough of substantially the same size as the troughs in said lower and upper bases, upper and lower surfaces of said central element being in convergent planes from the leg ends to the bight of the U-shaped opening, said bottom of said lower base and said top of said upper base being in substantially parallel planes when said bases and central element are in assembled relation.

6. A device for forming a tooth positioning appliance comprising a lower base, an upper base, a central element, said lower base being U-shape in plane and having a flat bottom and a continuous wall forming a U-shaped trough to receive and hold a model of lower teeth, said lower base trough forming wall sloping in height from a maximum at the ends of the legs of the U-shaped trough to a minimum at the bight thereof, said upper base being U-shape in plane and having a flat top and a continuous wall depending from said flat top forming a U-shaped trough to receive and hold a model of upper teeth, said upper base trough forming wall sloping in height from a maximum at the ends of the legs of the U-shaped trough to a minimum at the bight thereof, said troughs being of substantially the same size, said central element being U-shape in plane and having a U-shaped opening extending therethrough of substantially the same size as the troughs in said lower and upper bases, upper and lower surfaces of said central element being in convergent planes from the leg ends to the bight of the U-shaped opening, said bottom of said lower base and said top of said upper base being in substantially parallel planes when said bases and central element are in assembled relation, and pins mounted in one of said bases and central element and openings to receive said pins in the other of said bases and central element for aligning said bases and central element.

7. A device for forming a tooth positioning appliance comprising a lower base having a U-shaped trough to receive a model of lower teeth, an upper base having a U-shaped trough to receive a model of upper teeth, and a spacer between said bases disposing said bases in predetermined relation, said spacer comprising a U-shaped wall formed for disposition between the portions of said bases defining the inner walls of said U-shaped troughs permitting observation into said base troughs.

8. A dental flask set for forming a tooth positioning appliance comprising an upper base including a trough to receive and retain models of upper teeth, a lower base including a trough to receive and retain models of lower teeth, a removable central spacer element of a thickness and form spacing said base apart to positions to receive upper and lower teeth models in occluded positions, and a removable central member having an opening therethrough shaped as the troughs which replaces said central spacer element and spaces said bases with retained upper and lower models of teeth in normal relaxed positions, said central member receiving therein deformable material which receives and retains under the effects of upper and lower impressions from teeth models retained by said bases while in normal relaxed positions.

9. A device for forming a tooth positioning appliance comprising a lower base having a trough to receive a model of lower teeth, an upper base having a trough to receive a model of upper teeth, and a spacer between said bases disposing said bases in predetermined spaced relation, said spacer comprising a wall between the portions of said bases rearwardly of the troughs permitting observation into said base troughs.

References Cited in the file of this patent
UNITED STATES PATENTS

| | | |
|---|---|---|
| 2,378,633 | House | June 19, 1945 |
| 2,440,910 | Opotow | May 4, 1948 |
| 2,467,432 | Kesling | Apr. 19, 1949 |
| 2,471,205 | Fagan | May 24, 1949 |
| 2,479,780 | Remensnyder | Aug. 23, 1949 |
| 2,555,234 | Hughes | May 29, 1951 |
| 2,557,558 | Opotow | June 19, 1951 |